March 11, 1952     L. J. GIACOLETTO     2,588,513
ELECTROSTATIC HIGH-VOLTAGE GENERATOR
Filed June 10, 1949
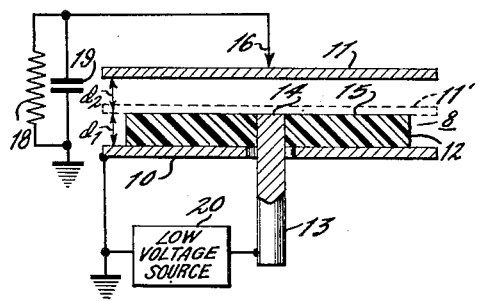
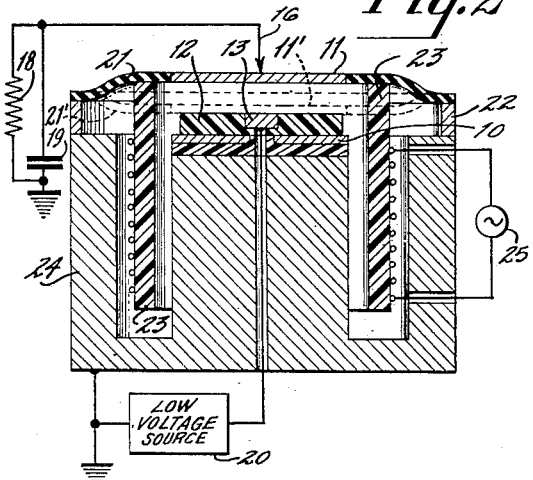
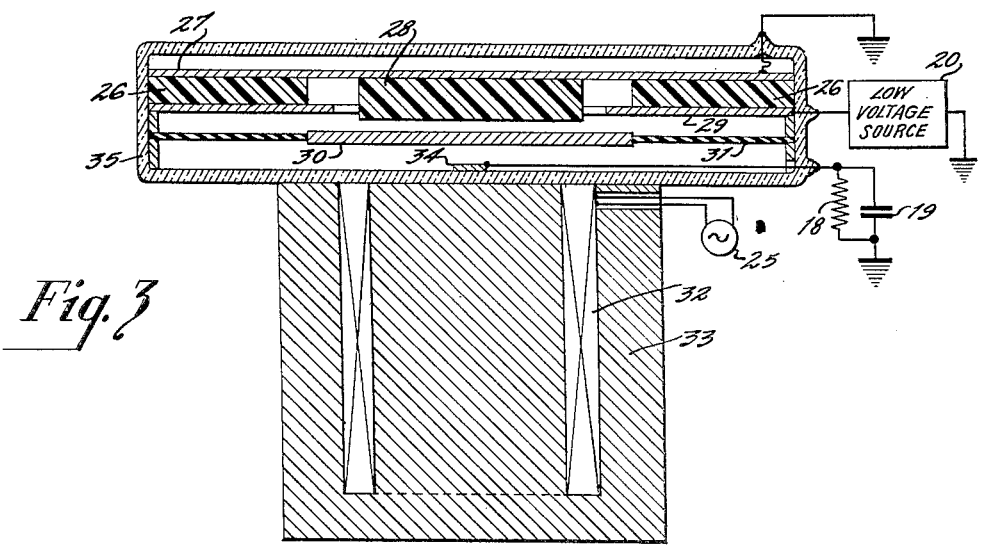
INVENTOR
*Lawrence J. Giacoletto*
BY
ATTORNEY Patented Mar. 11, 1952

2,588,513

UNITED STATES PATENT OFFICE 2,588,513

ELECTROSTATIC HIGH-VOLTAGE GENERATOR

Lawrence J. Giacoletto, Eatontown, N. J., assignor to Radio Corporation of America, a corporation of Delaware Application June 10, 1949, Serial No. 98,303

18 Claims. (Cl. 320—1)

This invention relates to electrostatic high voltage generators and is particularly concerned with electrostatic generators in which mechanical energy is converted to electrical energy by varying the capacity of a charged condenser.

As is well known, the electrical charge Q on a condenser is equal to the product of the capacity C of the condenser and the voltage or electrical potential difference V between the condenser plates (i. e. $Q=CV$). Separation of the plates of a condenser, after the condenser has been charged to a given potential V, will result in a variation in potential which is inversely proportional to the variation in capacity, since Q will remain essentially constant. If the condenser is arranged to be connected alternately to a source of charging potential and to a load circuit, and if the condenser be charged in the maximum capacity position and discharged in the minimum capacity position, the energy applied in separating the plates will be delivered to the load as electrical energy at a potential which is higher than the charging potential by the ratio of maximum to minimum capacity. A system of this general type is disclosed and claimed in a copending application Serial No. 19,945, filed April 9, 1948, Patent No. 2,490,733, issued December 6, 1949, by Ralph C. Kennedy, entitled "High Voltage Power Supply," and assigned to the assignee of the present invention.

In a system of the foregoing type, the energy delivered to the load will be equal to the product of the charge and the maximum potential, while the power delivered to the load will be equal to the product of the energy and the cyclic rate of operation per unit of time.

It will, therefore, be apparent that both output potential and output power will depend upon the maximum capacity of the condenser, the ratio of maximum to minimum capacity, and the charging potential, and that the power output will also be dependent upon the cyclic rate of operation.

A general object of this invention is to increase the voltage multiplication and power output obtainable from electrical generators of the type described.

Another object of the invention is to increase the voltage and power output of electrostatic generators by increasing the maximum capacity of the condenser relative to its physical size.

Another object of the invention is to increase the voltage and power output of electrostatic generators by increasing the ratio of maximum to minimum capacity relative to the physical displacement of the plates.

Still another object of the invention is to prevent or reduce the leakage of charge from the condenser during the period when the condenser capacity is being reduced.

Yet another object of the invention is to increase the cyclic rate at which the condenser may be charged and discharged by reducing the physical size of the condenser and the amplitude of displacement of the condenser elements.

A further object of the invention is to provide improved mechanism for delivering mechanical power to the condenser.

In accordance with one aspect of the invention, the foregoing and other objects and advantages are attained by providing a layer of dielectric material, having a dielectric constant higher than that of air, between the plates of a variable condenser of the type in which the plate movement is at right angles to the surfaces thereof. In this manner, the maximum capacity of the variable condenser is enormously increased, as well as the total available capacity change.

A more complete understanding of the invention can be had by reference to the following description of illustrative embodiments thereof when considered in connection with the accompanying drawings, wherein:

Figure 1 is a schematic diagram of a portion of a generator constructed in accordance with the invention;

Figure 2 is a more detailed illustration of a generator constructed in accordance with the invention;

Figure 3 illustrates a modification of the invention in which the condenser is enclosed within an evacuated envelope; and Figure 4 is illustrative of a generator in which novel electronic switching means are employed for charging and discharging the condenser.

It should be understood that the drawings are not to scale, certain dimensions being exaggerated for the sake of clarity. This is particularly true with respect to the spacing between the condenser plates and the thickness of the dielectric employed.

The generator illustrated in Figure 1 includes a variable condenser 8 having a fixed plate 10, a second plate 11 adapted to be shifted toward and away from the fixed plate 10 (between the positions indicated by 11 and 11'), and a layer of dielectric material 12 deposited on or secured to the plate 10. The thickness of the dielectric is indicated as $d_1$, and the amplitude of the movement of the plate 11 is indicated as $d_2$.

When the plate 11 is in the maximum capacity postion 11', it engages a contact member 13 having a contact face 14 coplanar with the exposed surface 15 of the dielectric layer 12. A discharging contact member 16 is disposed to engage the plate 11 when the latter is in the position 11 corresponding to minimum capacity of the condenser 8.

The contact member 16 is connected to a load shown as a resistor 18. In order to filter out pulsations in the load voltage, a filter capacitor 19 may be connected across the load 18. The variable condenser 8 is adapted to be charged from a low voltage source 20 which is connected between the contact 13 and the condenser plate 10.

The dielectric layer 12 may comprise any material having a dielectric constant higher than that of air or vacuum, which, for the purposes of this specification, will be taken to be unity. As will appear more fully hereinbelow, it is desirable that the dielectric constant of the layer 12 be as high as possible, and, accordingly, I prefer to use materials of the barium-strontium-titanate type, whose dielectric constants are of the order of thousands.

Qualitatively, the operation of the device is as follows. Assume the starting position of the movable plate 11 to be as indicated by the dotted outline 11'. In this position, the plate 11 will engage the contact member 13, and the condenser 8 will receive a charge from the source 20. The potential across the condenser 8 will be equal to the potential of the source 20. If, now, the plate 11 be shifted away from the dielectric layer 12, through a distance $d_2$, the capacity of the condenser 8 will be decreased, and, assuming that the charge remains constant, the potential difference between the plates 10, 11 must increase. When the plate 11 engages the contact 16 (which is at a lower potential than the new potential of the plate 11), the condenser 8 will discharge into the load 18 and the filter capacitor 19, reducing the potential across the condenser 8 to a value determined by the time the discharge continues and the rate of discharge. If the condenser plate 11 is now shifted back to its original position 11', upon engagement with contact member 13 the condenser 8 will again be charged to the potential of the charging source 20.

Quantitatively, the voltage multiplication achieved may be expressed in terms of the ratio of output potential $V_0$ to charging potential $V_c$ as follows:

$$\frac{V_0}{V_c} = \frac{C_1}{1 + \frac{K_1}{K_2} \times \frac{d_2}{d_1}}$$

where $C_1 = K_1 \epsilon_0 \frac{A}{d_1}$ = maximum capacity of the condenser 8

$\epsilon_0$ = the dielectric constant of free space = $8.85 \times 10^{-12}$ farad/meter
$V_0$ = output potential in volts
$V_c$ = charging potnetial in volts
A = the area of the dielectric layer 12
$K_1$ = the relative dielectric constant of the dielectric layer 12
$K_2$ = the relative dielectric constant of vacuum, air, or other gaseous medium in which the device is operated
$d_1$ = the thickness of the dielectric layer 12
$d_2$ = the amplitude of movement of the plate 11

If $K_1 = 1000$, $K_2 = 1$, and $d_1 = d_2$, it will be seen from the above expression that the ratio of maximum capacitance $C_1$ to minimum capacitance $C_2$, to a first approximation, will be 1000 to 1; that is, the ratio of maximum to minimum capacity will be approximately equal to the ratio of $K_1$ to $K_2$. This enormous ratio is attributable to the fact that the capacity of the condenser 8, at maximum capacity, is that of a condenser having a very large dielectric constant, while the capacity in the minimum capacity position is that of two condensers in series, due to the formation of a surface charge at the exposed surface 15 of the dielectric layer 12. For this reason, the ratio of maximum to minimum capacity is very high as compared with the amplitude of displacement of the plate 11, and as will appear more fully hereinbelow, is very much higher relative to the displacement than has hitherto been obtainable.

It will be seen that, in order to obtain the optimum ratio of maximum to minimum capacity, it is necessary to reduce the minimum magnitude of the distance $d_2$ to the smallest possible value. I have found that this can be accomplished by polishing the surface 15 of the dielectric layer 12 and also polishing the lower surface of the plate 11 in order to provide for extremely intimate engagement between the movable plate 11 and the dielectric layer 12.

It will also be understood that the increase of the maximum capacity through the employment of dielectric materials having high dielectric constants and the provision of extremely intimate engagement between the movable plate 11 and the dielectric 12 renders it possible to increase the power output obtainable from a condenser of the same area and with the same amplitude of displacement of condenser plate 11, or, conversely, that the same output can be obtained with either a smaller condenser or a smaller range of movement, or both.

Because the potential across the condenser 8 will increase with extreme rapidity, particularly at the time when the movable plate 11 is just breaking contact with the dielectric 12, it is important that the breaking of the contact between the movable plate 11 and the contact 13 be accurately timed. For example, if the movable plate 11 should move an appreciable distance from the dielectric 12 while the plate 11 is still connected to charging source 20, the charge would leak off into the charging source. Accordingly, it is desirable that the movable plate 11 be disengaged from the charging contact 13 at least as soon as the plate 11 begins to disengage the surface of the dielectric 12. In Fig. 1, this is accomplished, as has been mentioned, by polishing the contact surface 14 so that the latter is coplanar with the surface 15 of the dielectric layer 12.

The electrical energy delivered to the load 18 is derived almost entirely from the mechanical work done in varying the capacity of the condenser 8. Since the amplitude of displacement of the movable plate 11 is relatively small, the actuating force must be proportionately large.

In Figs. 2 and 3, I have illustrated two practical ways of supplying the required mechanical force to the condenser. In Fig. 2, the movable plate 11 is supported by a flexible diaphragm 21, which is, in turn, supported on a shoulder 22. Connected to the diaphragm 21 is a coil structure 23, comparable in construction to the moving coil of a dynamic loudspeaker. The coil structure 23 may comprise a coil former and winding as shown, or may comprise a "self-supporting" coil of usual form. A permanent magnet 24 supplies a polarized field with which the field of the coil structure 23 will interact. The coil structure 23 is supplied with electrical energy in the form of alternating current from a source 25. The moving system comprising the condenser plate 11 and the diaphragm 21 is preferably mechanically tuned to resonance at the frequency of the driving source 25 by proper choice of the mechanical parameters of mass, compliance, etc.

Since the potential across the condenser 8 will increase with great rapidity, particularly at the beginning of the movement separating the plates 10, 11, the potential gradient between the moving plate 11 and the charging contact 13 may exceed the breakdown potential of air, with the result that arcing will occur between the plate 11 and the contact 13. Accordingly, where the operating conditions are such as to produce potential gradients of this order, it is preferable to operate the device in a vacuum, as illustrated in Fig. 3, in which I have illustrated a pair of insulating and supporting members 26, a first condenser plate 27 resting on, but free for movement above, the supports 26, a dielectric layer 28 affixed to the center of the plate 27, a charging contact in the form of a plate 29 disposed below the support 26, and a moving plate 30 supported by a diaphragm 31 of flexible insulating material, such as rubber. The plate 30 is capable of movement upward and downward and is adapted to be moved by an alternating magnetic field set up by a coil 32 and a core 33. When the moving plate 30 is attracted by the coil 32, the plate 30 will move downwardly and engage an output contact 34. Toward the other extreme of its motion, the plate 30 first will engage the lower surface of the dielectric layer 28, and, continuing upward, will carry the dielectric layer 28 (and the plate 27) upwardly until the plate 30 engages the charging contact 29. During the downward half of the cycle, the plate 30 will clear the charging contact 29 but will remain in engagement with the lower surface of the dielectric 28 until the plate 27 comes to rest on the supports 26. In this manner, the plate 30 is well separated from the charging contact 29 before the potential on the plate 30 begins to increase above the potential of the charging source 20. The condenser formed by the plates 27, 30, and contact members 29, 34 are enclosed in an evacuated envelope 35, as a result of which difficulties due to ionization are eliminated.

In Fig. 4, I have illustrated an arrangement whereby mechanical switching can be entirely eliminated without incurring high voltage insulation problems. It is, of course, well known that conventional rectifier tubes can be used for electronic switching, except that where high voltages are involved insulation problems often make conventional rectifiers impractical to use. In Fig. 4, I have illustrated diagrammatically a fixed plate 10, a moving plate 11, and a dielectric layer 12, which represent the corresponding elements of the arrangements disclosed in Figs. 1 and 2. I also have illustrated a coil 23 representing an electromagnetic driving arrangement for the condenser 8, similar to that shown in Fig. 2, and adapted to be energized by a source of alternating current 23. I also show a secondary-electron discharge device 38 comprising a thermionic cathode 39 (which may be directly or indirectly heated by a filament, not shown), a pair of control grids 40, 41, a pair of dynodes (secondary electron emitters) 42, 43, and a pair of collector electrodes 44, 45. While I have represented the system comprising the grid 40, the dynode 42 and the collector 44 as being enclosed by the same envelope as the corresponding elements on the right-hand side of the tube, it will be understood that these elements might also be enclosed by separate envelopes and provided with separate cathodes. Rectifier circuits utilizing tubes of this type have been described more fully and claimed in my copending application Serial No. 98,302, filed June 10, 1949, now Patent #2,504,322, issued April 18, 1950, for "Electrical Transfer Network." In the arrangement of Fig. 4, the fixed plate 10 is grounded, as is one terminal of a source of charging potential 20 and one terminal of the output circuit diagrammatically represented by a resistor 18. The movable condenser plate 11 is connected to the dynode electrode 42 and to the collector 45. The positive terminal of the charging source 46 is connected to the collector electrode 44, and the positive terminal of the output circuit is connected to dynode 43.

Ignoring, for the moment, the presence of the grids 40, 41, the operation of the circuit will be as follows: assume that the apparatus is started with the condenser plate 11 touching the dielectric 12, i. e., the condenser 8 is at maximum capacity. Electrons emitted from the cathode 39 will strike the dynode 42, which will emit secondary electrons. The secondary electrons from the dynode 42 will be drawn to the collector 44 by virtue of the positive potential across the charging source 20. Accordingly, the dynode 42 and the condenser plate 11 will be raised to the potential of the output terminal of the charging source 20. Assume now that the plate 11 begins to move away from the dielectric 12. As the potential of the plate 11 (and, hence of the dynode 42) rises above the potential of the collector 44, the flow of secondary electrons from the dynode 42 to the collector 44 will terminate. The potential on the moving plate 11 will continue to rise, and ultimately will reach a value exceeding the potential of the positive terminal of the output circuit. Since primary electrons from the cathode 39 will be striking the dynode 43, secondary electrons from the dynode 43 will be drawn to the collector 45, thus transferring energy to the output circuit and reducing the charge on the condenser 8. As the movement of the plate 11 reverses and the plate approaches the dielectric 12, the potential of the plate 11 will decrease until it falls below the potential of the collector 44 on the left-hand side of the tube 38, at which time secondary electrons will again be drawn from the dynode 42 to the collector 44, recharging the condenser 8.

However, the operation discussed above would not be satisfactory for the following reason: consider the condition which will exist when the plate 11 is moving away from the dielectric 12 and the potential of the dynode 42 has risen above that of the collector 44. As has been stated above, secondary electrons will no longer be drawn to the collector 44, and the condenser 8 will be effectively isolated from the charging source 46. However, primary electrons from the cathode 39 will be attracted to the dynode 42 by virtue of the high potential thereon, and will tend to discharge the condenser 8. Similarly, primary electrons from the cathode 39 will be attracted to the dynode 43, reducing the potential of the output circuit except during those periods when secondary electrons are removed from the dynode 43 by the collector 45 in greater number than the number of primary electrons striking the dynode 43.

I eliminate this problem by employing the grids 40, 41 to control the two electron streams in such a way that primary electrons will strike the dynodes 42, 43 only during the periods when secondary electrons are being removed from the dynodes. While other means of obtaining the necessary control potentials will occur to those skilled in the art, I prefer to accomplish this by energizing the grids 40, 41 180° out of phase by a voltage derived from the source 37. In this way, extremely precise control of the two electron streams can be obtained and the electrical "operating angle" of the two electron streams (i. e. the portion of the cycle during which the condensers 27, 30 will be discharged due to primary electron flow from the cathode 39) can be controlled with nicety. In order to insure the release of secondary electrons from the dynodes 42, 43 during initial charge buildup, the cathode 39 is preferably biased slightly negative with respect to ground, as by means of a tap on a bias battery $E_c$.

Since many changes could be made in the apparatus shown and described, all within the scope and spirit of the invention, the foregoing is to be construed as illustrative, and not in a limiting sense.

What is claimed is:

1. An electrostatic device comprising a first condenser plate, a second condenser plate, a solid dielectric layer between said plates, means for periodically moving one of said plates in a direction substantially at right angles to the surface thereof to vary the relationship between said plates from a first condition in which said plates are in intimate contact with opposite faces of said layer to a second condition in which said one plate is spatially separated from said layer, a source of charging potential, a high voltage utilizing circuit, first switch means arranged to interconnect said one plate with said source while said one plate is in contact with said layer and to break said connection at least as soon as said one plate begins to shift from said engagement, and second switch means to interconnect said one plate with said circuit in said second condition.

2. An electrostatic device comprising a first condenser plate, a dielectric layer thereon, a second condenser plate movable substantially at right angles to the surface thereof into and out of engagement with said dielectric layer, a source of mechanical energy for so moving said plate, a source of potential, an output circuit, a switch element arranged to make a connection between said movable plate and said potential source when said plate is in engagement with said dielectric and to break said connection at least as soon as said plate moves from engagement with said dielectric, and a second switch element for connecting said movable plate to said output circuit when said movable plate is out of engagement with said dielectric.

3. An electrostatic generator including a condenser comprising a pair of parallel plates mounted for movement toward and away from one another and a solid dielectric layer on one of said plates, means for effecting relative movement of said plates in a direction substantially at right angles to the surfaces thereof from a first position in which both plates are in intimate contact with said layer to a second position in which one of said plates is out of contact with said layer, means including a first switch for charging said condenser when said plates are in said first position, and means including a second switch for discharging said condenser when said plates are in said second position.

4. An electrostatic generator including a condenser comprising parallel condenser plates, a solid dielectric therebetween, mechanism for shifting said plates relative to one another in a direction substantially at right angles to the surfaces thereof from a first position in which said plates are separated only by said solid dielectric to a second position in which said plates are separated by a distance greater than the thickness of said dielectric, means including a switch for charging said condenser when said plates are in said first position, and means including a second switch for discharging said condenser when said plates are in said second position.

5. In an electrostatic generator of the type which comprises means for (1) charging a variable condenser at maximum capacity, (2) reducing the capacity of the condenser, and (3) discharging the condenser, in combination, a variable condenser comprising a pair of condenser plates movable relative to each other in a direction substantially at right angles to the surfaces thereof, and a solid dielectric disposed between said plates and having a dielectric constant substantially greater than unity and of thickness equal to the separation of said plates in the maximum capacity condition.

6. An electrostatic generator comprising a first condenser plate, a dielectric layer in juxtaposition to said plate, a second condenser plate adapted to be juxtaposed to the opposite face of said dielectric layer, mechanism for shifting said second plate from said juxtaposition to a position removed therefrom by a distance comparable to the thickness of said layer, and means for charging and discharging the condenser formed by said plates when said second plate is in said juxtaposed and second positions, respectively.

7. The method of deriving a high electrical potential, said method comprising the steps of juxtaposing a conductive plate to the exposed side of a dielectric layer disposed on a second conductive plate, connecting the condenser formed by said plates to a source of charging potential, disconnecting said plates from said source, moving said first plate away from said layer in a direction substantially at right angles to the surface thereof, and connecting said condenser to a utilizing circuit.

8. An electrostatic device comprising a fixed condenser plate, a dielectric layer thereon, a second condenser plate movable to and from engagement with the face of the dielectric layer not engaged by said first plate, a charging contact for the movable plate coplanar with the exposed face of said dielectric, and a discharging contact arranged to engage the movable plate when said movable plate is out of engagement with said dielectric.

9. An electrostatic generator comprising a variable condenser including (1) a pair of condenser plates movable relative to each other in a direction substantially at right angles to the surface thereof and (2) a solid dielectric of thickness equal to the separation of said plates when said condenser is in the maximum capacity condition and having a dielectric constant substantially greater than unity, and drive mechanism for for varying the capacity of said condenser, said mechanism being tuned to mechanical resonance at the driving frequency thereof.

10. A construction in accordance with claim 9 in which said drive mechanism comprises an electromagnetic system energized by an alternating electric current of a frequency equal to the mechanical resonance frequency of said driving mechanism.

11. In a source of electrical energy, in combination, a variable condenser, means for mechanically varying the capicity of said condenser from a maximum to a minimum value, and a secondary electron discharge device for connecting said condenser to an external circuit, said device including a dynode electrode and a collector electrode, one of said electrodes being connected to said condenser and the other of said electrodes being connected to said circuit.

12. A construction in accordance with claim 11 in which said external circuit is a charging circuit.

13. A construction in accordance with claim 11 in which said external circuit is a discharging circuit.

14. A construction in accordance with claim 11 including two of said devices and a source of charging potential, one of said devices interconnecting said condenser and said source of charging potential, and the other of said devices interconnecting said condenser and said external circuit.

15. A construction in accordance with claim 11 including a source of periodically varying current, and a control electrode in said device, said capacity varying means being energized by said current source, and said control electrode being energized by said current source to limit the electrical operating angle of said device.

16. A source of electrical energy comprising a variable condenser, means for mechanically varying the capacity of said condenser from a maximum to a minimum value, means for charging said condenser at maximum capacity, and means including a secondary electron discharge device for discharging said condenser at minimum capacity, said device including cathode, dynode and collector electrodes, said cathode being operated at about ground potential, said dynode being connected to a potential utilizing circuit, and said collector being connected to said condenser.

17. A source of electrical energy comprising a variable condenser, means for mechanically varying the capacity of said condenser from a maximum to a minimum value, means for discharging said condenser at minimum capacity into a load circuit, and means including a source of charging potential and a secondary electron discharge device for charging said condenser, said device including cathode, dynode and collector electrodes, said cathode being operated at about ground potential, said dynode being connected to said condenser, and said collector being connected to said source of charging potential.

18. A source of electrical energy comprising a variable condenser, electromechanical means including a source of periodically varying current for varying the capacity of said condenser, an electron discharge device for connecting said condenser to an external circuit, said device including dynode and collector electrode, one of said electrodes being connected to said condenser and the other of said electrodes being connected to said circuit, and said device further including a cathode to supply electrons for bombardment of said dynode and a control electrode for controlling the bombardment of said dynode, said control electrode being connected to said source of varying current.

LAWRENCE J. GIACOLETTO.

REFERENCES CITED

The following references are of record in the file of this patent:

UNITED STATES PATENTS

| Number | Name | Date |
| --- | --- | --- |
| 2,091,663 | Walden | Aug. 31, 1937 |
| 2,321,285 | Ehret et al. | June 8, 1943 |
| 2,406,492 | Dorsman | Aug. 27, 1946 |
| 2,413,391 | Usselman | Dec. 31, 1946 |
| 2,417,452 | Stiefel | Mar. 18, 1947 |
| 2,467,744 | Harris | Apr. 19, 1949 |